United States Patent
Challener et al.

(10) Patent No.: US 6,553,497 B1
(45) Date of Patent: Apr. 22, 2003

(54) ELECTROMAGNETIC FIELD TAMPER ALARM

(75) Inventors: David C. Challener, Raleigh, NC (US); Barry D. Atkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/275,753

(22) Filed: Mar. 25, 1999

(51) Int. Cl.$^7$ ............................................. G06F 13/00
(52) U.S. Cl. ...................... 713/200; 713/201; 340/568; 340/687; 340/652; 340/428
(58) Field of Search .................... 713/200, 201, 713/193; 340/5.32, 5.33, 5.5, 5.74, 531, 539, 568, 568.3, 569, 572.1, 572.8, 635, 657, 658, 660, 825.36; 380/25; 361/111, 56, 58

(56) References Cited

U.S. PATENT DOCUMENTS

| | | | |
|---|---|---|---|
| 4,427,974 A | * 1/1984 | Sheahan | 340/333 |
| 4,882,752 A | * 11/1989 | Lindman et al. | 340/5.5 |
| 5,032,823 A | * 7/1991 | Bower et al. | 340/531 |
| 5,243,648 A | * 9/1993 | Gilardi et al. | 361/111 |
| 5,715,174 A | * 2/1998 | Cotichini et al. | 340/568.2 |
| 5,724,260 A | * 3/1998 | Klein | 702/186 |
| 5,970,227 A | * 10/1999 | Dayan et al. | 340/5.3 |
| 5,973,604 A | * 10/1999 | Eslambolchi et al. | 324/102 |
| 6,014,747 A | * 1/2000 | Fackenthall et al. | 340/568.3 |

* cited by examiner

Primary Examiner—Ly V. Hua
(74) Attorney, Agent, or Firm—Carlos Munoz-Bustamante

(57) ABSTRACT

The present invention is a method and system for providing a tamper alarm for a computer system. The method includes detecting tampering of the computer system, and transmitting electromagnetic field signals from a device concerning the tampering. In the preferred embodiment, the electromagnetic field signals are transmitted through patterns on a monitor or a video card which transmits a computer system identity information. The electromagnetic field signal of the present invention functions as a tamper alarm. When a receiver hears the alarm, the administrator of the computer system may act accordingly. The tamper evidence alarm may be transmitted in a manner which does not require the disabling of the computer system, thus increasing the ease of its use over conventional methods. Because the computer system is not disabled, a password is not required in order to regain access to the computer system. Also, the present invention may be practiced using existing hardware in the computer system, and thus is cost efficient to implement.

24 Claims, 2 Drawing Sheets

ELECTROMAGNETIC FIELD TAMPER ALARM

FIELD OF THE INVENTION

The present invention relates to security in computer systems, and more particularly to the handling of evidence of tampering of a computer system.

BACKGROUND OF THE INVENTION

Security in computer systems is becoming increasingly important to users today. An important aspect to the security is the ability to detect when someone tampers with a computer system and to alert the administrator to the tampering. "Tampering", as used in this specification, refers to any type of activity which could signify unauthorized access to the computer system. Examples of tampering include the opening of the case without a key and the moving of the computer.

One conventional method of providing an alarm when a computer system has been tampered with is the use of the Privileged Access Password (PAP) method. With this method, when there is evidence of tampering, the entire computer system is disabled. A PAP would then be required to access the computer system. Typically, the disabling under the PAP method seldom occurs, which results in administrators easily forgetting the PAP. Unless the PAP is entered; the disabling of the computer system is permanent. Because of the permanency of the disable feature and the ease in which the PAP could be forgotten, many computer system administrators do not engage the PAP system, which defeats the purpose of having such a system.

Accordingly, what is needed is a system and method for providing an alarm for tampering in a computer system which is easier to use than conventional methods. The method and system should be cost efficient to implement. The present invention addresses such a need.

SUMMARY OF THE INVENTION

The present invention is a method and system for providing a tamper alarm for a computer system. The method includes detecting tampering of the computer system, and transmitting electromagnetic field signals from a device concerning the tampering. In the preferred embodiment, the electromagnetic field signals are transmitted through patterns on a monitor or a video card which transmits a computer system identity information. The electromagnetic field signal of the present invention functions as a tamper alarm. When a receiver hears the alarm, the administrator of the computer system may act accordingly. The tamper evidence alarm may be transmitted in a manner which does not require the disabling of the computer system, thus increasing the ease of its use over conventional methods. Because the system is not disabled, a password is not required in order to regain access to the computer system. Also, the present invention may be practiced using existing hardware in the computer system, and thus is cost efficient to implement.

DETAILED DESCRIPTION

The present invention provides a method and system for providing an alarm for tampering in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
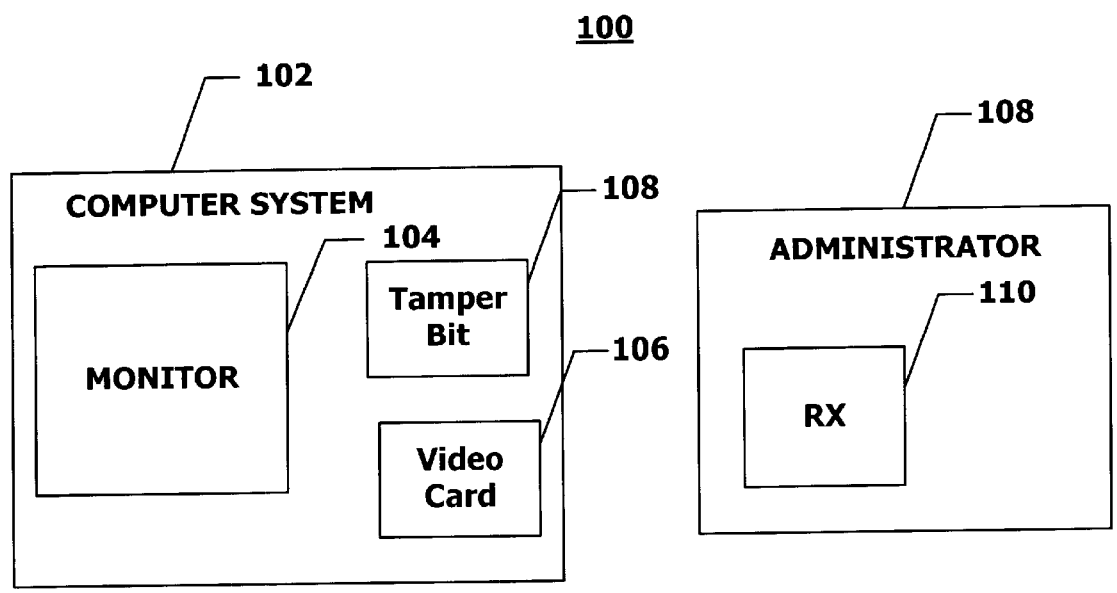
FIG. 1 is a block diagram illustrating a system which utilizes the method of providing an alarm for tampering in a computer system in accordance with the present invention.

FIG. 1 is a block diagram illustrating a system which utilizes the method of providing an alarm for tampering in a computer system in accordance with the present invention. The system 100 comprises a computer system 102, which includes a video monitor 104 which may be electronically coupled to a video card 106 and a tamper bit 108. The video card 106 operates to manage the signals which emulate from the monitor 104. The tamper bit 108 is set when the computer system 100 detects any tampering. The monitor 104 emits an electromagnetic field (EMF) signal which is detectable by a receiver 110 of the administrator 108 of the computer system 102. A single receiver 110 may be used to detect EMF signals from more than one computer system.

Patterns may be sent from a video card for display on the screen of the monitor 104 to modulate the EMF which the monitor produces in such a way as to broadcast a tone on a specific frequency. These EM signals may be used to broadcast information. For example, the pattern may be changed so that it emits a sequence of two different tones representing binary numbers, i.e., "1"'s and "0"'s. For another example, different tones may be used to represent each digit of the data transmitted by the pattern. A technique for creating the pattern is described in "Soft Tempest: Hidden Data Transmission Using Electromagnetic Emanations", by Kuhn, M. and Anderson, R., which appeared in David Aucsmith (Ed.): Information Hiding, Second International Workshop, IH'98, Portland, Oreg., USA, Apr. 15–17, 1998. The electromagnetic broadcast of data is well known in the art and will not be described in further detail here.

Figure 2:
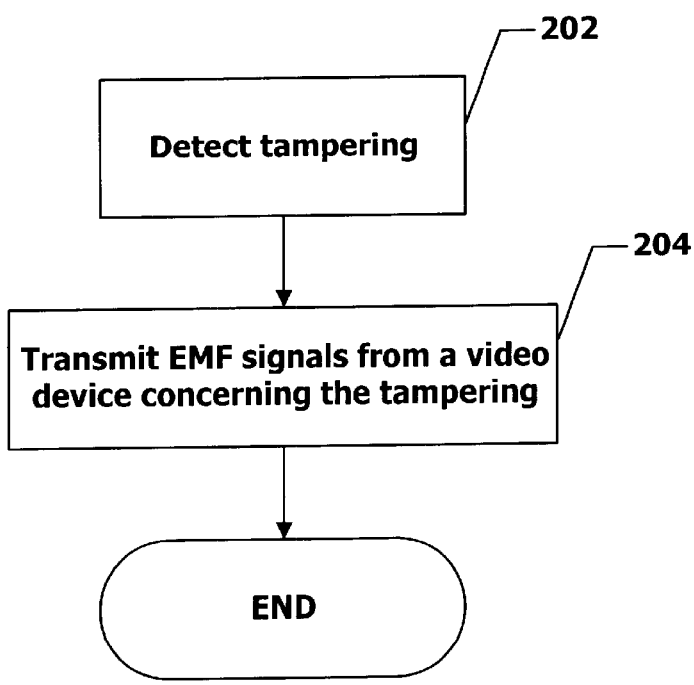
FIG. 2 is a flow chart illustrating a preferred embodiment of a method for providing an alarm for tapering in a computer system in accordance with the present invention.

FIG. 2 is a flow chart illustrating a preferred embodiment of a method for providing an alarm for tampering in a computer system in accordance with the present invention. First, tampering is detected, via step 202. EMF signals are then transmitted concerning the tampering, via step 204.

Figure 3:
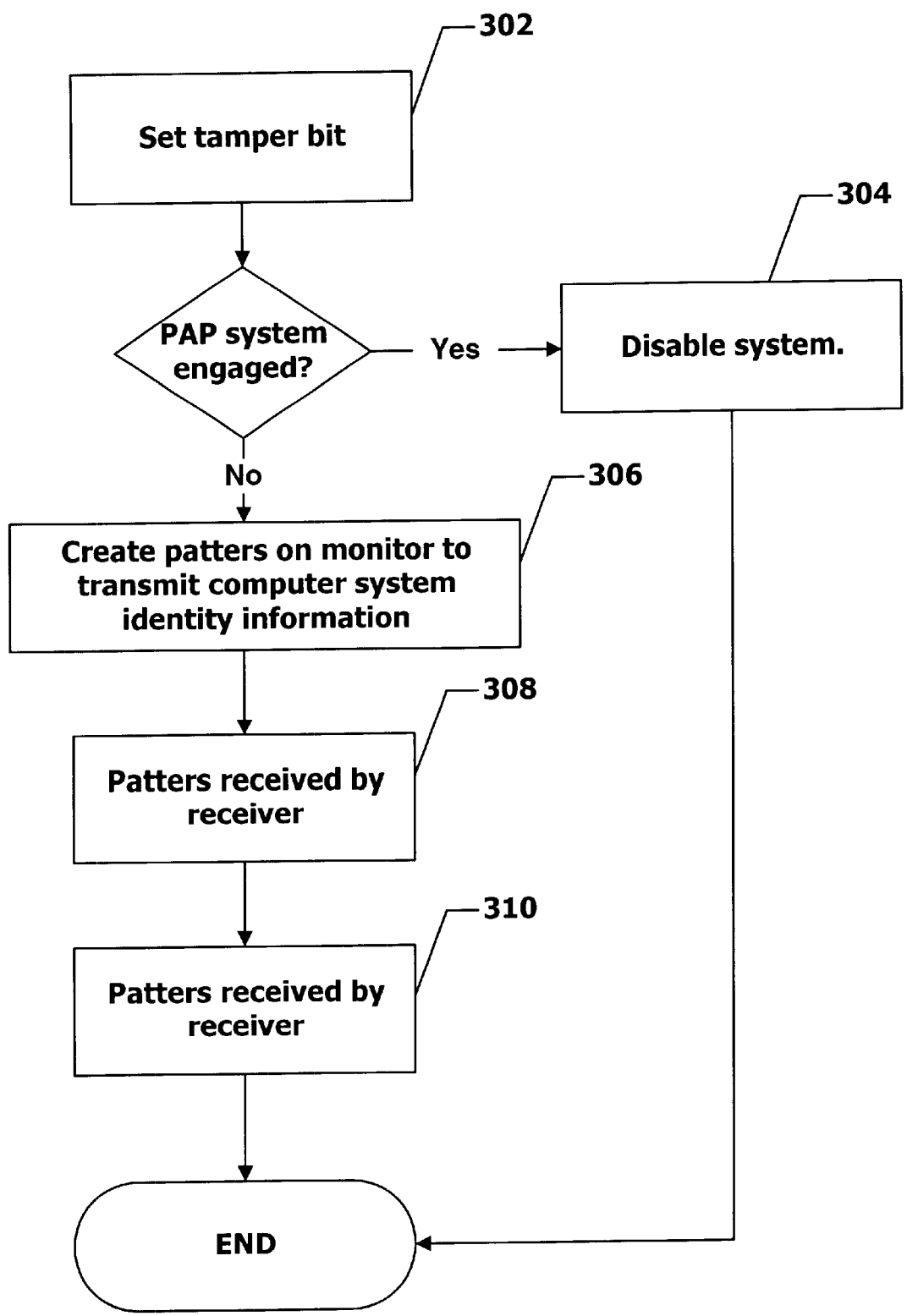
FIG. 3 is a flow chart illustrating in more detail the preferred embodiment of a method for providing an alarm for tampering in a computer system in accordance with the present invention.

The preferred embodiment is illustrated in more detail in FIG. 3. First, when tampering is detected by the computer system 102, the tamper bit 108 is set, via step 302. If the Priority Access Password (PAP) system is engaged, then the computer system 102 is disabled, via step 304. The PAP is then required for access to the computer system 102. If not, then patterns are created on the monitor to transmit the computer system identity information, via step 306. The computer system identity information can be the serial number of the computer system 102. Thus, the patterns transmit a series of tones which represent the serial number of the computer system 102. In the preferred embodiment, the patterns are created on the monitor 104 using the technique described by Kuhn and Anderson in the publication referenced above. However, other techniques may be used without departing from the spirit and scope of the present invention. The pattern is received by the receiver 110, via step 308. The administrator 108 is now alerted to possible tampering and can identify the computer system 102 which may have been tampered with. The administrator 108 can act accordingly, such as by investigating the cause of the alarm, via step 310. For example, if the computer system 102 is part of a computer network, then the network's administrator 108 may connect with the computer system 102 and conduct the investigation.

The EMF patterns may be located in the toolbar, the background, or in the margins of the monitor 104 so as not to disturb the end user visually. The same EMF patterns may be created using only the video card 106 so that the EMF tamper alarm may be triggered even if the monitor 104 is not on, although the strength of the signal will be much reduced.

A method and system for providing an alarm for tampering in a computer system has been disclosed. The present invention creates EMF signals which emulates from the monitor of a computer system. This EMF signals transmit an alarm when tampering is detected. When a receiver hears the alarm, the administrator of the computer system may act accordingly. The tamper evidence alarm may be transmitted in a manner which does not require the disabling of the computer system, thus increasing the ease of its use over conventional methods. Because the computer system is not disabled, a password, such as the PAP, is not required in order to regain access to the computer system. Also, the present invention may be practiced using existing hardware in the computer system, i.e., the monitor and/or the video card, and thus is cost efficient to implement.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method comprising the steps of:
   (a) detecting tampering of a computer system; and
   (b) transmitting electromagnetic field signals from a device concerning the tampering wherein said transmitting step comprises creating patterns by a video card to transmit a computer system identity information.

2. A method comprising the steps of:
   (a) detecting tampering of a computer system; and
   (b) transmitting electromagnetic field signals from a device concerning the tampering wherein said transmitting step comprises creating patterns on a monitor to transmit a computer system identity information.

3. The method of claim 2, wherein the computer system identity information is a serial number of the computer system.

4. A system comprising:
   a detector which detects tampering of a computer system; and
   a video device capable of emitting electromagnetic field signals in response to a detecting of tampering as detected by the detector.

5. The system of claim 4, wherein the detector comprises a tamper bit which is set when tampering is detected.

6. The system of claim 4, wherein the video device is a monitor capable of creating a pattern to transmit a computer system identity information.

7. The system of claim 4, wherein the video device is a video card capable of creating a pattern to transmit a computer system identity information.

8. The system of claim 4, wherein the computer system identity information is a serial number of the computer system.

9. The system of claim 4, further comprising:
   a receiver capable of receiving the electromagnetic field signals; and
   a means for investigating the tampering.

10. A method comprising the steps of:
    (a) detecting tampering of a computer system; and
    (b) creating patterns on a monitor to transmit a computer system identity information.

11. The method of claim 10, wherein the computer system identity information is a serial number of the computer system.

12. The method of claim 10, further comprising:
    (c) receiving the patterns; and
    (d) investigating the tampering.

13. A system comprising:
    a detector circuit which detects evidence of tampering of a computer system; and
    a monitor which creates patterns to transmit a computer system identity information.

14. The system of claim 13, wherein the detector circuit comprises a tamper bit which is set when tampering is detected.

15. The system of claim 13, wherein the computer system identity information is a serial number of the computer system.

16. The system of claim 13, further comprising:
    a receiver capable of receiving the patterns; and
    an investigating circuit which investigates the tampering.

17. A method comprising the steps of:
    (a) detecting tampering of a computer system;
    (b) creating patterns on a monitor to transmit a serial number of the computer system;
    (c) receiving the patterns; and
    (d) investigating the tampering.

18. A comprising the steps of:
    (a) detecting tampering of a computer system;
    (b) creating patterns on a video card to transmit a serial number of the computer system;
    (c) receiving the patterns; and
    (d) investigating the tampering.

19. A system comprising:
    a means for detecting tampering of a computer system, comprising, a tamper bit which is set when tampering is detected;
    a monitor capable of creating patterns to transmit a serial number of the computer system;
    a receiver capable of receiving the patterns; and
    a means for investigating the tampering.

20. A system comprising:
    a means for detecting tampering of a computer system, comprising, a tamper bit which is set when tampering is detected;
    a video card capable of creating patterns to transmit a serial number of the computer system;

a receiver capable of receiving the patterns; and a means for investigating the tampering.

21. A system comprising:

a tamper detector which detects a tampering in a first system and generates a tamper signal in response to the tampering;

a monitor which provides visible and invisible display output; and an alarm subsystem, coupled to said tamper detector and said monitor, comprising a processor for processing digital data and memory for storing digital data and coupled to the processor and a control program stored in the memory and accessible by the processor to direct the processing of digital data by the processor, the control program and the processor cooperating, when the control program is executing on the processor and in response to the tamper signal, in generating invisible display output on said monitor which encodes information indicative of the first system; whereby the information indicative of the first system is radiated by the parasitic electromagnetic fields of said monitor.

22. The system of claim 21, further comprising:

a second system comprising:

a parasitic electromagnetic field receiver which receives the parasitic electromagnetic fields emitted by said monitor as encoded by said security subsystem by said generated invisible display output and generates a received output signal; and a decoder which decodes the received output signal and generates information indicative of the first system.

23. A system comprising:

a tamper detector which detects a tampering in a first system and generates a tamper signal in response to the tampering;

a monitor which provides visible and invisible display output; and an security subsystem, coupled to said tamper detector and said monitor, comprising a processor for processing digital data and memory for storing digital data and coupled to the processor and a control program stored in the memory and accessible by the processor to direct the processing of digital data by the processor, the control program and the processor cooperating, when the control program is executing on the processor and in response to the tamper signal, in:

(a) determining if a priority access password (PAP) system is engaged;

(b) disabling the first system when said determination (a) is made;

(c) generating invisible display output on said monitor which encodes information indicative of the first system when said determination (a) is not made, whereby the information indicative of the first system is radiated by the parasitic electromagnetic fields of said monitor.

24. The system of claim 23, further comprising:

a second system comprising:

a parasitic electromagnetic field receiver which receives the parasitic electromagnetic fields emitted by said monitor as encoded by said security subsystem by said generated invisible display output and generates a received output signal; and a decoder which decodes the received output signal and generates information indicative of the first system.

\* \* \* \* \*